United States Patent Office 3,239,554
Patented Mar. 8, 1966

3,239,554
CHLORINATED BICYCLOÖCTENES
Homer J. Sims, Philadelphia, Pa., assignor to Rohm & Haas Company, Philadelphia, Pa., a corporation of Delaware
No Drawing. Filed Oct. 24, 1961, Ser. No. 147,196
6 Claims. (Cl. 260—468)

This application is a continuation-in-part of application Serial No. 57,628, filed September 22, 1960, now abandoned.

This invention deals with specific chlorinated bicyclooctenes as new compositions of matter. It further deals with the method for the preparation of these chlorinated bicyclooctenes.

The compounds of the present invention may be represented by the formula

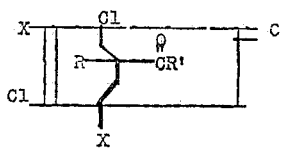

in which R represents a hydrogen atom or a methyl group, R' represents a hydroxy, methoxy, ethoxy, or methyl group, and X represents a chlorine or a hydrogen atom.

The preferred compounds of the present invention may be represented by the formula

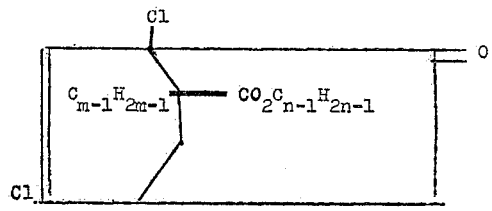

in which $m$ is an integer of one to two and $n$ is an integer of one to three.

The compounds of the present invention are prepared by reacting a compound having the formula

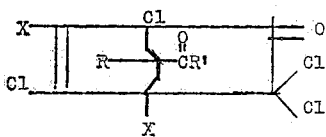

with hydrogen. It is essential that the hydrogen be supplied by a hydrogen generating bimetallic complex or a metal-acid system that produces hydrogen. The preferred catalyst is a zinc-copper couple, which, as is known, can be made from a zinc-copper sulfate or zinc-copper chloride system. Also preferred are zinc, iron, or tin with hydrochloric acid, sulfuric acid, acetic acid, or other acids which produce hydrogen with the aforementioned metals. Outstanding catalytic embodiments are the zinc-copper couple and zinc with a hydrogen producing acid, such as hydrochloric acid, as discussed before.

It is important that one strictly adhere to the definition of the hydrogen generating system in order that the compounds of the present invention be obtained without any observable change in the carbon to carbon double bond. Other more severe hydrogenation systems would attack the carbon to carbon double bond of the reactants and substantially alter the course of the reaction away from that desired in the present invention.

The bicyclooctene reactants employed in the present invention may be prepared by reacting a chlorinated phenylhypochlorite with ethyl acrylate, methyl methacrylate, acrylic acid, methacrylic acid, or methyl vinyl ketone.

The present reaction is conducted in the temperature range of about 25° to 110° C., preferably 25° to 80° C. It is desirable to add an inert volatile, organic solvent, such as an alcohol, to dissolve the organic starting materials and products. There may be employed as a solvent methanol, ethanol, or similar water-soluble solvents not affected by the reducing agents being used.

The products obtained are solids that are usually white or light colored and they are isolated by merely cooling the reaction mixture or by evaporating the solvent, if one has been employed. The product may be recrystallized from water-alcohol systems or the like.

The products of this invention are valuable fungicides, especially when applied against Stemphylium sarcinaeforme in the usual amounts and evaluated according to standard techniques. Concentrations of up to about 0.1% by weight in a commercial carrier are effective in this respect. Outstanding as a fungicide is 1,5-dichloro-2-keto-7-carbomethoxy[2.2.2]bicyclooctene-5. The compounds of the present invention are also useful as fire-proofing agents in polyesters, particularly those compounds that contain three to four chlorine atoms. The present compounds exhibit herbicidal activity and are especially effective when used in post-emergence applications against dioctyledonous plants according to standard techniques.

The compounds of this invention, as well as the method for their preparation, may be more fully understood by the following examples, which are offered by way of illustration and not by way of limitation. Parts by weight are used throughout.

Example 1

Zinc dust (6.5 parts, 0.1 mole) is added to a solution of 1,3,3,5-tetrachloro-2-keto-7-carbomethoxy[2.2.2]bicyclooctene-5 (6.36 parts, 0.02 mole) in 90 ml. of ethanol and 10 ml. of water. The mixture is heated to reflux and 10 ml. of 5% aqueous copper sulfate solution is added during 30 minutes. After a total of 18 hours refluxing the mixture is filtered hot. The solution is cooled and treated with 100 ml. of water to precipitate 4.2 parts of white solid, M.P. 112° to 116° C. This is recrystallized from a mixture of 35 ml. ethanol and 25 ml. water. After drying at 45°/10 mm., the product weighs 3.2 parts (64%), M.P. 115° to 118° C. The product contains 48.23% carbon (theoretical 48.21%), 4.04% hydrogen (theoretical 4.05%), and 28.59% chlorine (theoretical 28.46%), and is identified as 1,5-dichloro-2-keto-7-carbomethoxy[2.2.2]bicyclooctene-5 having the formula

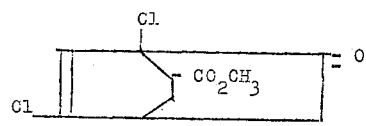

Example 2

Three parts (.01 mole) of 1,3,3,5-tetrachloro-2-keto-7-acetyl-[2.2.2]bicyclooctene-5 is mixed with 60 ml. of methanol, 10 ml. water and 5 parts zinc dust. The mixture is stirred while adding 6.5 ml. of hydrochloric acid dropwise. The temperature of the reaction mixture rises to 40° to 45° C. After the addition of the hydrochloric acid is completed, the mixture is refluxed one hour and filtered hot. The solution is diluted with 150 ml. of water and cooled and the solid removed by filtration. The product, after drying, weighs 1.5 parts (65%) and melts at 104° to 105° C. The product contains 51.67% carbon (theoretical 51.52%), 4.42% hydrogen (theoretical 4.32%), and 30.8% chlorine (theoretical 30.43%), and is identified as 1,5-dichloro-2-keto-7-acetyl-[2.2.2]bicyclo-octene-5 having the formula

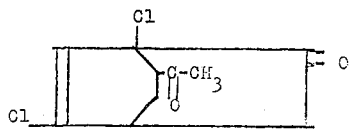

*Example 3*

3.18 parts of 1,3,3,5-tetrachloro-2-keto-7-methyl-7-carboxy-[2.2.2]bicyclooct-5-ene is dissolved in 50 parts of methanol and 5 parts of water. To this is added 5 parts of zinc dust in small portions while stirring. The temperature rises to about 40° C. Concentrated hydrochloric acid (6 parts) is then added dropwise during 30 minutes. After the mixture has stirred an additional 30 minutes, it is filtered. Most of the methanol is removed under aspirator vacuum. The product (1.1 part) separates as white crystals having a melting point of 202° to 204° C. It has a neutralization equivalent of 250 (theoretical 249). The product contains 48.11% carbon (theoretical 48.21%), 4.09% hydrogen (theoretical 4.05%), and 28.15% chlorine (theoretical 28.47%). The product may be represented by the formula

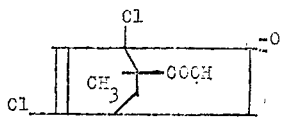

*Example 4*

3.87 parts of 1,3,3,4,5,6-hexachloro-2-keto-7-carbomethoxy[2.2.2]bicyclooct-5-ene is dissolved in 50 parts of acetone. To this is added 5 parts of zinc dust. A mixture of 6 parts of concentrated hydrochloric acid and 6 parts of water is added in small portions during a half-hour. The temperature of the reaction mixture rises to about 45° C. The reaction mixture is stirred an additional half-hour and filtered. When the solvent is removed under aspirator vacuum, the product separates as an oil. Crystals begin to form slowly but it is found expedient to treat the material as follows to get a pure product. The oily substance is taken up in ether and the solution dried over magnesium sulfate. The ether is evaporated to yield 2 parts of white crystalline material having a melting point of 117° to 120° C. This is recrystallized from a minimum amount of methanol to obtain 1 part of solid having a melting point of 119° to 122° C. The product contains 37.79% carbon (theoretical 37.77%), 2.60% hydrogen (theoretical 2.53%), and 44.60% chlorine (theoretical 44.60%). The product may be represented by the formula

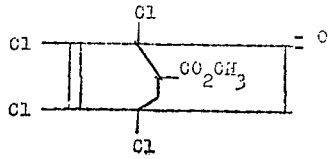

I claim:
1. A compound of the formula

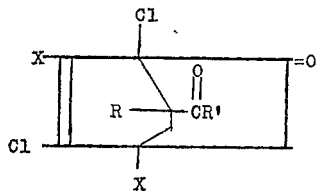

in which R is a member selected from the class consisting of hydrogen and methyl, R' is a member selected from the class consisting of hydroxy, methoxy, ethoxy, and methyl, and X is a member selected from the class consisting of hydrogen and chlorine.

2. The compound having the formula

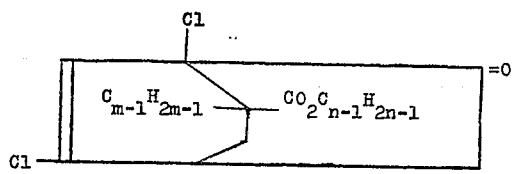

in which $m$ is an integer of one to two and $n$ is an integer of one to three.

3. The compound, 1,5-dichloro-2-keto-7-carbomethoxy [2.2.2]-bicyclooctene-5.

4. The compound, 1,5-dichloro-2-keto-7-acetyl-[2.2.2]-bicyclooctene-5.

5. The compound, 1,5 - dichloro-2-keto-7-carboxy-7-methyl[2.2.2] bicyclooctene-5.

6. The compound, 1,4,5,6-tetrachloro-2-keto-7-carbomethoxy[2.2.2]bicyclooctene-5.

References Cited by the Examiner

UNITED STATES PATENTS 3,117,989   1/1964   Sims _____ 260—468

OTHER REFERENCES

Burger: Medicinal Chemistry (New York, 1960), page 1055.

Horsfall: Principles of Fungicidal Action (Mass., 1956), pages 72–3.

Houben-Wehl: Methoden der Organischen Chemie, Vierte Auflag, volume 5/4 (Stuttgart, 1960), pages 768–9, 762–3, 599.

McBee et al.: J. Am. Chem. Soc., volume 77, 86–88 (1955).

LORRAINE A. WEINBERGER, *Primary Examiner.*

DUVAL T. McCLUTCHEN, IRVING MARCUS,
*Examiners.*